US009388650B2

(12) United States Patent
Leuchtenberg

(10) Patent No.: US 9,388,650 B2
(45) Date of Patent: Jul. 12, 2016

(54) DRILLING APPARATUS

(75) Inventor: Christian Leuchtenberg, Singapore (SG)

(73) Assignee: MANAGED PRESSURE OPERATIONS PTE LTD, Singapore (SG)

( * ) Notice: Subject to any disclaimer, the term of this patent is extended or adjusted under 35 U.S.C. 154(b) by 592 days.

(21) Appl. No.: 13/822,914

(22) PCT Filed: Sep. 13, 2011

(86) PCT No.: PCT/EP2011/065834

§ 371 (c)(1),
(2), (4) Date: Jun. 28, 2013

(87) PCT Pub. No.: WO2012/035001

PCT Pub. Date: Mar. 22, 2012

(65) Prior Publication Data

US 2013/0299240 A1 Nov. 14, 2013

(30) Foreign Application Priority Data

Sep. 15, 2010 (GB) .................................. 1015408.6

(51) Int. Cl.
*E21B 21/08* (2006.01)
*E21B 21/10* (2006.01)
(Continued)

(52) U.S. Cl.
CPC ................. *E21B 21/08* (2013.01); *E21B 21/01* (2013.01); *E21B 21/106* (2013.01); *E21B 47/10* (2013.01); *F15B 15/065* (2013.01)

(58) Field of Classification Search
CPC ... E21B 21/06; E21B 2021/006; E21B 21/12; E21B 21/063; E21B 21/01; E21B 21/106; E21B 21/08; E21B 21/10; E21B 47/10; E21B 44/00; F15B 15/065
See application file for complete search history.

(56) References Cited

U.S. PATENT DOCUMENTS

| | | | |
|---|---|---|---|
| 3,338,319 | A | 8/1967 | Griffin |
| 3,563,511 | A | 2/1971 | Bentley-Leek |

(Continued)

FOREIGN PATENT DOCUMENTS

| | | | |
|---|---|---|---|
| CN | 85100330 | A | 1/1987 |
| CN | 1513110 | A | 7/2004 |

(Continued)

OTHER PUBLICATIONS

UK Intellectual Property Office Search Report (GB1015408.6), dated Dec. 20, 2010.

(Continued)

*Primary Examiner* — Michael Wills, III
(74) *Attorney, Agent, or Firm* — Norman B. Thot

(57) ABSTRACT

A drilling system including a drill string (12) which extends into a borehole (10), and a well closure system which contains fluid in the annular space (16) in the borehole around the drill string, the well closure system having a side bore whereby controlled flow of fluid out of the annular space in the borehole around the drill string is permitted, the side bore being connected to fluid return line (28) which extends from the side bore to a fluid reservoir (34), there being provided in the fluid return line a valve (30*a*) which is operable to restrict flow of fluid along the fluid return line to variable extent, and a flow meter (32) operable to measure the rate of flow of fluid along the fluid return line, the flow meter being located between the valve and the side bore, wherein a filter (40) is provided between the flow meter and the side bore, the filter including a plurality of apertures which have a smaller cross-sectional area than the smallest fluid flow lines in the flow meter.

14 Claims, 5 Drawing Sheets

(51) Int. Cl.

| | |
|---|---|
| ***E21B 47/10*** | (2012.01) |
| ***E21B 21/01*** | (2006.01) |
| *F15B 15/06* | (2006.01) |

(56) References Cited

U.S. PATENT DOCUMENTS

| | | | | |
|---|---|---|---|---|
| 4,953,618 | A * | 9/1990 | Hamid | E21B 33/068 166/250.01 |
| 6,263,981 | B1 | 7/2001 | Gonzalez | |
| 6,413,297 | B1 | 7/2002 | Morgan et al. | |
| 7,603,916 | B2 * | 10/2009 | Gysling | G01F 1/36 73/861.42 |
| 8,061,186 | B2 * | 11/2011 | Gysling | G01N 29/024 73/61.54 |
| 2004/0065477 | A1 | 4/2004 | Paulk et al. | |
| 2006/0162792 | A1 | 7/2006 | Oh | |
| 2007/0151762 | A1 | 7/2007 | Reitsma | |
| 2007/0151763 | A1 | 7/2007 | Reitsma et al. | |
| 2007/0246263 | A1 * | 10/2007 | Reitsma | E21B 21/06 175/38 |
| 2010/0305882 | A1 * | 12/2010 | Gysling | G01F 1/7082 702/47 |

FOREIGN PATENT DOCUMENTS

| | | | |
|---|---|---|---|
| EP | 0022644 | A1 | 1/1981 |
| EP | 2075403 | A1 | 7/2009 |
| WO | 2000003144 | A1 | 1/2000 |
| WO | 03071091 | A1 | 8/2003 |
| WO | 2005017308 | A1 | 2/2005 |
| WO | 2007034152 | A1 | 3/2007 |
| WO | 2008051978 | A1 | 5/2008 |
| WO | 2010115834 | A2 | 10/2010 |
| WO | 2011058031 | A2 | 5/2011 |

OTHER PUBLICATIONS

PCT Int'l Search Report (PCT/EP2011/065834), dated Jun. 14, 2012.

The State Intellectual Property Office of China, First Notification of Office Action for 201180044432.7, dated Apr. 3, 2015; Applicant or Patentee: Managed Pressure Operations Pte Ltd.; Title of Invention: "Managed Pressure Drilling Apparatus".

* cited by examiner

DRILLING APPARATUS

BACKGROUND

1. Field of the Disclosure

The present invention relates to an apparatus for drilling a subterranean bore hole, particularly but not exclusively an oil, gas or geothermal well, using a technique known as managed pressure drilling.

2. Description of Related Art

The drilling of a borehole or well is typically carried out using a steel pipe known as a drill string with a drill bit on the lowermost end. The entire drill string may be rotated using an over-ground drilling motor, or the drill bit may be rotated independently of the drill string using a fluid powered motor or motors mounted in the drill string just above the drill bit. As drilling progresses, a flow of mud is used to carry the debris created by the drilling process out of the borehole. Mud is pumped through an inlet line down the drill string to pass through the drill bit, and returns to the surface via the annular space between the outer diameter of the drill string and the borehole (generally referred to as the annulus). Mud is a very broad drilling term, and in this context it is used to describe any fluid or fluid mixture used during drilling and covers a broad spectrum from air, nitrogen, misted fluids in air or nitrogen, foamed fluids with air or nitrogen, aerated or nitrified fluids to heavily weighted mixtures of oil or water with solid particles. Significant pressure is required to drive the mud along this flow path, and to achieve this, the mud is typically pumped into the drill string using one or more positive displacement pumps which are connected to the drill string via a pipe and manifold known as the standpipe manifold.

The geological formations into which such boreholes are typically drilled often comprise a reservoir of pressurised fluid (oil, gas and/or water), and the mud flow, in addition to flushing out the debris and cooling the drill bit, pressurises the borehole, thus substantially preventing uncontrolled flow of fluid from the formation into the borehole. Flow of formation fluid into the borehole is known as a kick, and, if not controlled, can lead to a blow out. Whilst pressurising the borehole is required to avoid kicks or a blow out, if the fluid pressure in the borehole is too high, the fluid pressure could cause the formation to fracture, and/or mud could penetrate and be lost to the formation. Thus, whilst the pressure provided by the weight of the mud in the bore hole, and the dynamic pressure created by the pumping of the mud into the borehole may be enough to contain the fluid in the formation, for many formations greater and faster control over the fluid pressure in the borehole is required, and one drilling method suitable for drilling into such formations is managed pressure drilling (MPD).

Managed pressure drilling (MPD) involves controlling the bottom hole pressure by the application of a back-pressure to mud exiting from the annulus of the borehole. The most relevant elements of a conventional prior art managed pressure drilling system are illustrated schematically in FIG. 1. This figure shows a borehole 10' which extends into a geological formation 11' comprising a reservoir of fluid such as oil, gas or water. A drill string 12' extends down into the bore hole 12'. At the lowermost end of the drill string 12' there is a bottom hole assembly (BHA) 14' comprising a drill bit, a mud motor, various sensors, and telecommunications equipment for transmitting readings from the sensors to surface monitoring and control equipment. The uppermost end of the drill string 12' extends to a drilling rig (not shown for clarity).

The borehole 10' is capped with a well head 18', and a closure device 20' such as a rotating blow out preventer (BOP) or rotating control device (RCD). The drill string 12' extends through the well head 18 and closure device 20', the closure device 20' having seals which close around the exterior of the drill string 12' to provide a substantially fluid tight seal around the drill string 12' whilst allowing the drill string to rotate about its longitudinal axis, and to be reciprocated into and out of the borehole 10'. Together, the well head 18' and closure device 20' isolate the fluid in the annulus 16'.

In this example, the drill string 12' extends from the closure device 20' to a driving apparatus 22' such as a top drive, and the uppermost end of the drill string 12' is connected to the outlet port of a standpipe manifold 24' which has an inlet port connected by an inlet line to a mud pump 26'. The well head 18' includes a side port **18*a*' which is connected to an annulus return line 28', and which provides an outlet for fluid from the annulus 16'. The annulus return line 28' extends to a mud reservoir 34' via an adjustable choke or valve 30' and a Coriolis flow meter 32' which is downstream of the choke/valve 30'. Filters and/or shakers (not shown) are generally provided to remove particulate matter such as drill cuttings from the mud prior to its return to the mud reservoir 34'**.

During drilling, the top drive 22' rotates the drill string 12' about its longitudinal axis so that the drill bit cuts into the formation, and the pump 26' is operated to pump mud from the reservoir 34' to the standpipe manifold 24' and into the drill string 12' where it flows into the annulus 16' via the BHA 14'. The mud and drill cuttings flow up the annulus 16' to the well head 18', and into the annulus return line 28', and the adjustable choke or valve 32' is operated to restrict flow of this fluid along the annulus return line 28', and, therefore, to apply a back-pressure is applied to the annulus 16'. This back-pressure is increased until the fluid pressure at the bottom of the wellbore 10' (the bottom hole pressure) is deemed sufficient to contain the formation fluids in the formation 11' whilst minimising the risk of fracturing the formation or causing mud to penetrate the formation. The rate of flow of fluid out of the annulus 16' is monitored using the flow meter 32', and compared with the rate of fluid into the drill string 12', and this data may be used to detect a kick or loss of mud to the formation.

Such a system is, for example, disclosed in U.S. Pat. No. 6,575,244, and U.S. Pat. No. 7,044,237.

Managed pressure drilling systems in which a pump is provided to assist in the development of the required bottom hole pressure by pumping mud back into the annulus 16 via the annulus return line are also known and are, for example, disclosed in U.S. Pat. No. 7,185,719, U.S. Pat. No. 7,395,878, US 2007/0151762, WO 2007/081711, and WO 2008/051978.

BRIEF SUMMARY OF THE DISCLOSURE

According to a first aspect of the invention we provide a drilling system including a drill string which extends into a borehole, and a well closure system which contains fluid in the annular space in the borehole around the drill string, the well closure system having a side port whereby controlled flow of fluid out of the annular space in the borehole around the drill string is permitted, the side port being connected to fluid return line which extends from the side port to a fluid reservoir, there being provided in the fluid return line a valve which is operable to restrict flow of fluid along the fluid return line to variable extent, and a flow meter operable to measure the rate of flow of fluid along the fluid return line, the flow meter being located between the valve and the side port, wherein a filter is provided between the flow meter and the side port, the filter including a plurality of apertures which have a smaller cross-sectional area than the smallest fluid flow lines in the flow meter.

Preferably the flow meter is a Coriolis flow meter.

The flow meter may be located in a branch line off the fluid return line which extends between a first portion of the fluid return line and a second portion of the fluid return line, the first portion being located between the side port and the second portion. In this case, preferably the filter is located at or adjacent to the junction between the branch line and the first portion of the fluid return line. The filter may have an edge or edges which are located at the junction between the branch line and the first portion of the fluid return line, and a central portion which extends into the branch line.

Preferably an active sonar flow meter is provided to measure the rate of fluid flow along the fluid return line. In this case, the active sonar flow meter is preferably located between the side port and the Coriolis flow meter. The active sonar flow meter may be a clamp-on meter.

Advantageously, an inlet line extends into the drill string from a pump, and a second active sonar flow meter is provided to measure the rate of fluid flow along the inlet line. In this case, the second active sonar flow meter is preferable a clamp-on meter.

According to a second aspect of the invention we provide a drilling system including a drill string which extends into a borehole, and a well closure system which contains fluid in the annular space in the borehole around the drill string, the well closure system having a side port whereby controlled flow of fluid out of the annular space in the borehole around the drill string is permitted, the side port being connected to fluid return line which extends from the side port to a fluid reservoir, there being provided in the fluid return line a valve which includes a valve member which is rotatable to restrict flow of fluid along the fluid return line to variable extent.

Preferably the valve includes a valve body, the valve body having a passage with a longitudinal axis which extends from a valve inlet to a valve outlet, the passage forming part of the fluid return line, and wherein the valve member is a generally spherical ball which is mounted in the passage of the valve body. In this case, the valve member preferably includes a central passage which extends through the ball and which has a longitudinal axis, the valve member being rotatable between a closed position in which the longitudinal axis of the central passage extends at around 90° to the longitudinal axis of the passage in the valve body, and an open position in which the longitudinal axis of the central passage is generally parallel to the longitudinal axis of the passage in the valve body. The cross-section of the central passage perpendicular to its longitudinal axis may taper from a short side to a tall side, the height of the central passage increasing generally linearly from the short side to the tall side.

The ball may be arranged in the valve body such that when rotated from the closed position to the open position, the short side of the central passage is first to open into the passage of the valve body. The cross-section of the central passage perpendicular to its longitudinal axis may have the shape of a sector of a circle.

The valve may be provided with an actuator stem, rotation of which about its longitudinal axis causes rotation of the valve member between the open position and the closed position. In this case, the actuator stem preferably has a pinion portion with a plurality of radial teeth, and the valve is provided with at least one actuator piston with a toothed rod which engages with the pinion portion of the actuator stem so that translational movement of the piston causes rotation of the actuator stem and valve member. The valve may be provided with four actuator pistons each with a toothed rod which engages with the pinion portion of the actuator stem.

The or each piston may be mounted in an actuator housing and engages with the actuator housing so that the actuator housing and piston enclose a control chamber, the actuator housing being provided with a conduit whereby fluid flow into the control chamber.

According to a third aspect of the invention we provide a valve including a valve member and a valve body having a passage with a longitudinal axis which extends from a valve inlet to a valve outlet, wherein the valve member is a generally spherical ball which is mounted in the passage of the valve body and includes a central passage which extends through the ball and which has a longitudinal axis, the valve member being rotatable between a closed position in which the longitudinal axis of the central passage extends at around 90° to the longitudinal axis of the passage in the valve body, and an open position in which the longitudinal axis of the central passage is generally parallel to the longitudinal axis of the passage in the valve body, wherein the cross-section of the central passage perpendicular to its longitudinal axis tapers from a short side to a tall side, the height of the central passage increasing generally linearly from the short side to the tall side.

According to a fourth aspect of the invention we provide a drilling system including a drill string which extends into a borehole, and a well closure system which contains fluid in the annular space in the borehole around the drill string, the well closure system having a side port whereby controlled flow of fluid out of the annular space in the borehole around the drill string is permitted, the side port being connected to fluid return line which extends from the side port to a fluid reservoir, the drilling system also including a valve, the valve having an inlet port which is connected to the fluid return line, a first outlet port which is connected to a gas separator apparatus for separating entrained gas from a liquid, a second outlet port which is connected to a solid separator apparatus for separating solid particles from a liquid, wherein the valve is operable to selectively permit flow of fluid from the inlet port to either the first outlet port or the second outlet port whilst never preventing flow of fluid from the inlet port to both of the outlet ports.

Preferably the gas separator has an outlet for liquid which is connected to an inlet of the solid separator.

Preferably the solid separator has an outlet for liquid which is connected to the reservoir.

Advantageously, the solid separator comprises at least one shaker.

BRIEF DESCRIPTION OF THE DRAWINGS

An embodiment of the invention will now be described, by way of example only, with reference to the accompanying drawings of which.

DETAILED DESCRIPTION OF THE DISCLOSURE

Figure 1:
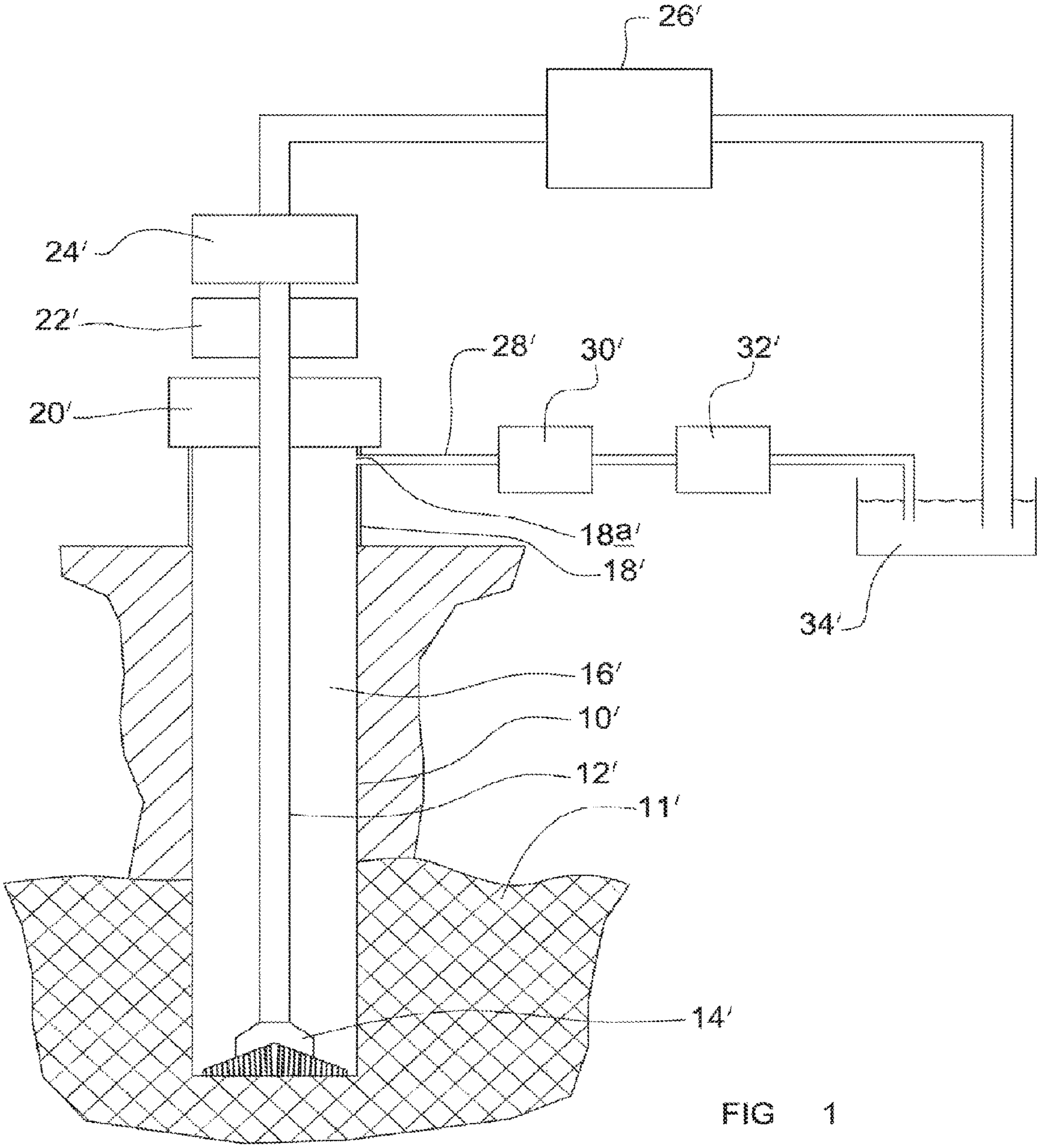
FIG 1 Prior Art
FIG. 1 shows a schematic illustration of a prior art managed pressure drilling system.
Figure 2:
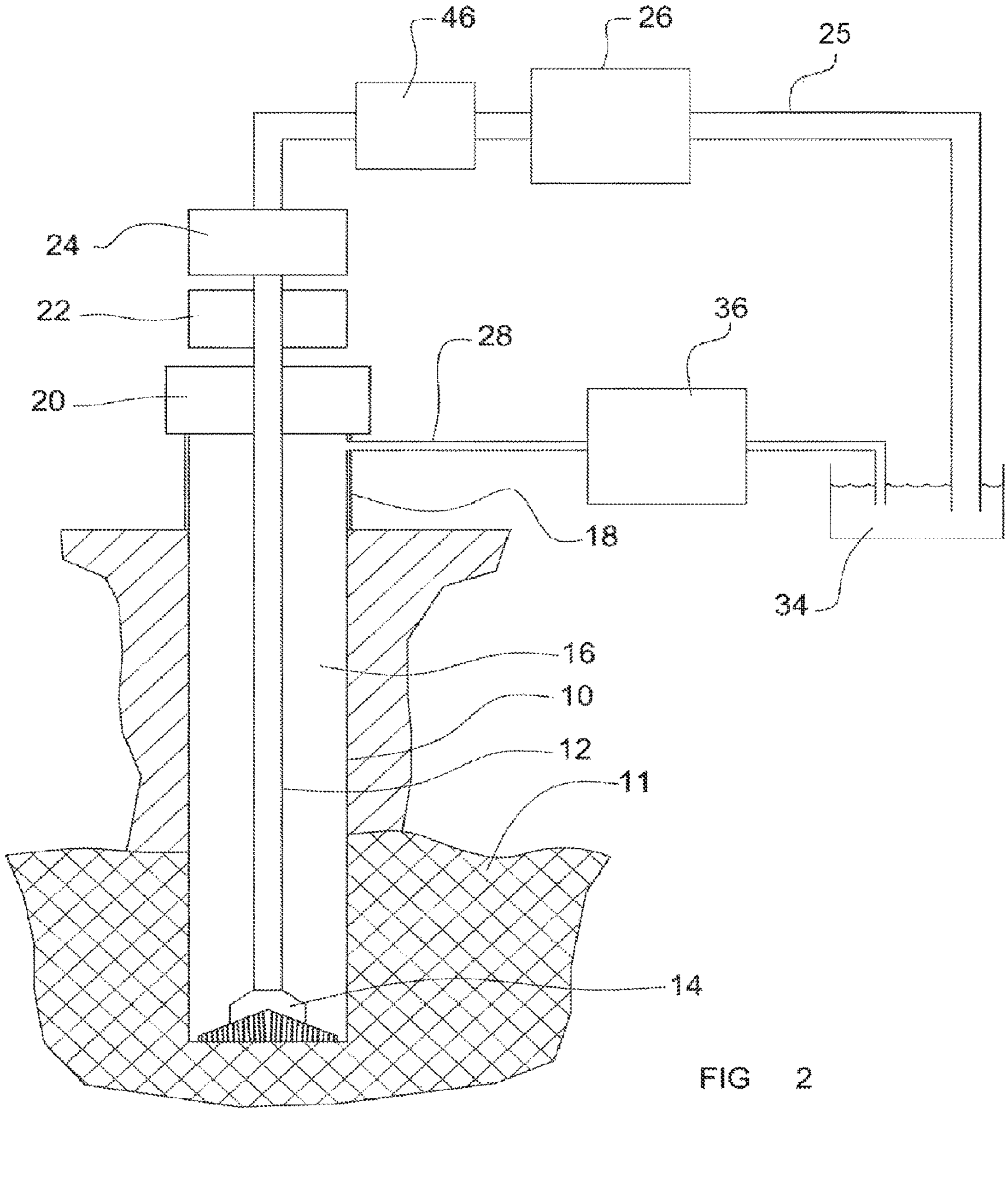
FIG. 2 shows a schematic illustration of a drilling system according to the invention.

Referring now to FIG. 2, this shows a schematic illustration of a land-based system for drilling a subterranean borehole. It should be appreciated, however, that the invention may equally be used in relation to an off-shore drilling system. This figure shows a borehole 10 which extends into a geological formation 11 comprising a reservoir of fluid such as oil, gas or water. A drill string 12 extends down into the bore hole 10. At the lowermost end of the drill string 12 there is a bottom hole assembly (BHA) 14 comprising a drill bit, a mud motor, various sensors, and telecommunications equipment for transmitting readings from the sensors to surface monitoring and control equipment. The uppermost end of the drill string 12 extends to a drilling rig (not shown for clarity).

The borehole 10 is capped with a well head 18, and a closure device 20 such as a rotating blow out preventer (BOP) or rotating control device (RCD). The drill string 12 extends through the well head 18 and closure device 20, the closure device 20 having seals closure around the exterior of the drill string 12 to provide a substantially fluid tight seal around the drill string 12 whilst allowing the drill string to rotate about its longitudinal axis, and to be moved further down into and out of the borehole 10. Together, the well head 18 and closure device 20 contain the fluid in the annulus 16.

In this example, the drill string 12 extends from the closure device 20 to a driving apparatus 22 such as a top drive, and the uppermost end of the drill string 12 is connected to the outlet port of a standpipe manifold 24 which has an inlet port connected by an inlet line 25 to a mud pump 26. A flow meter 46 in this embodiment of the invention a clamp-on active sonar meter, is mounted on the inlet line 25 between the mud pump 26 and the standpipe manifold 24, and this provides an output signal indicative of the rate of mud flow into the drill string 12.

In standard managed pressure drilling systems, the rate of fluid flow into the drill string 12 is measured by counting the number of strokes of the pump 26, for example using piston stroke counter whiskers, piston stroke counter proximity sensors or pump drive shaft rpm sensors, and multiplying this by the volume of fluid displaced per stroke. These methods are all mechanical and record mechanical activity of the pump rather than measuring the fluid flow directly. As such, all are of variable reliability and accuracy and are prone to failure. In contrast, an active sonar meter provides a direct, accurate and reliable measurement of the fluid flow into the drill string 12.

The standard mechanical equipment for measuring the injected fluid flow rate as described above is advantageously provided in addition to the active sonar meter 46, and therefore can be used to calibrate the active sonar meter 46 prior to commencement of drilling.

The well head 18 includes a side port **18*a* which is connected to an annulus return line 28, and which provides an outlet for fluid from the annulus 16. The annulus return line 28 extends to a mud reservoir 34 via a novel back pressure system 36 which is illustrated in more detail in FIG. 3. A fluid flow in provided between the pump 26 and the reservoir 34 so that the pump 26 can be operated to draw mud from the reservoir 34 and pump it into the drill string 12 via the standpipe manifold 24**.

Figure 3:
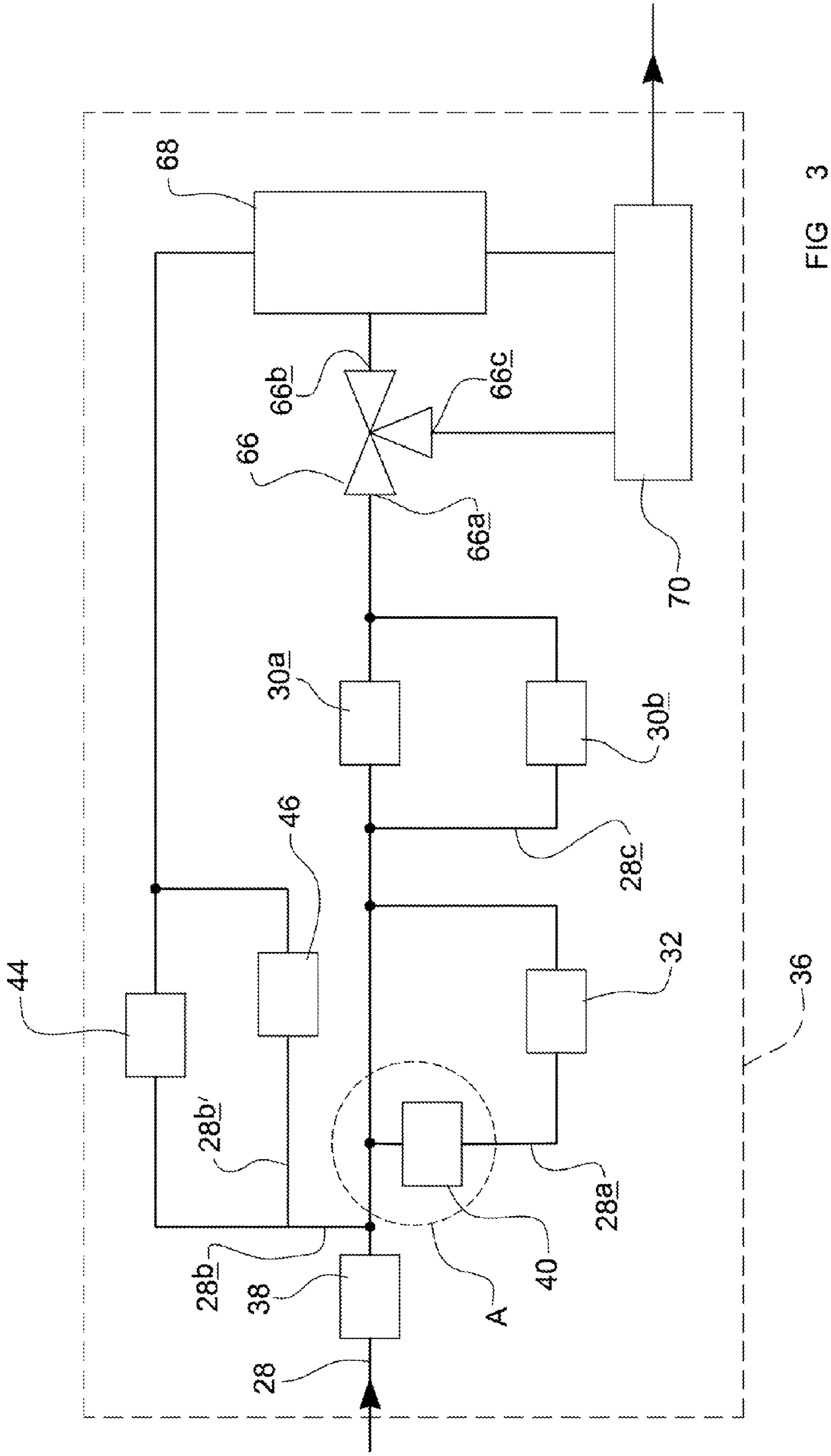
FIG. 3 shows a detailed schematic illustration of the back pressure control apparatus of the drilling system shown in FIG. 2.

Referring now to FIG. 3, the back pressure system 36 is configured as follows. The annulus return line 28 extends to an adjustable choke or valve **30*a* (hereinafter referred to as the back pressure control valve 30*a*) via an active sonar flow meter 38 which is upstream of the back pressure control valve 30*a*. The active sonar flow meter 38 is a non-intrusive clump on meter which does not have any effect on the flow of fluid along, and therefore the pressure of fluid in, the annulus return line 28, and cannot increase the possibility of plugging or blocking of the annulus return line 28** with debris.

Figure 4:
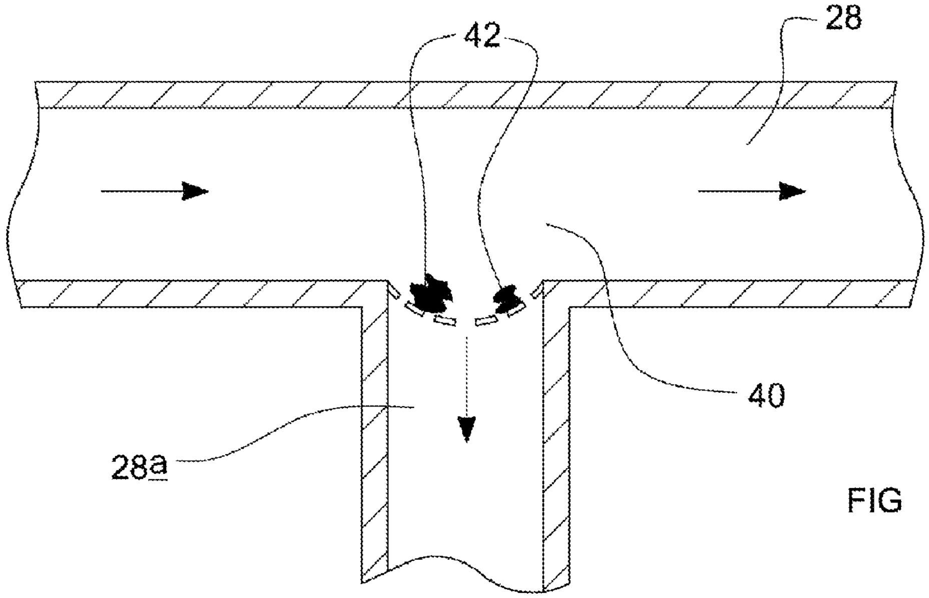
FIG. 4 shows a detailed illustration of cross-section of the portion A of the back pressure control apparatus shown in FIG. 3.

A first further fluid flow line **28*a* (hereinafter referred to as the Coriolis meter line) extends from the annulus return line 28 between the active sonar flow meter 38 and the choke 30*a* to a Coriolis type flow meter via an upstream filter 40. The filter 40 comprises either a mesh screen or a perforated sheet which is located at the junction between the Coriolis meter line 28*a* and the annulus return line 28 as illustrated in FIG. 4. The filter 40 is slightly domed and arranged so that the centre portion of the filter 40 extends into the Coriolis meter line 28. This is illustrated in FIG. 4, although it should be appreciated that this drawing is not to scale, and the degree of doming of the filter 40** is exaggerated for clarity.

Coriolis flow meters are often used in drilling systems, so the construction and operation of these are well-known to those of skill in the art. Briefly, however, the Coriolis meter comprises two tubes, fluid flowing into the meter being split between the two tubes, so that half flows along each tube before leaving the meter. A drive coil is provided, and this is configured such that passage of an electrical current through this causes the tubes to vibrate at their natural frequency, each in the opposite sense to the other. A magnet and coil assembly called a pick-off is mounted on each tube. As each tube vibrates, each coil moves through the magnetic field produced by the magnet on the other tube, and this induces a sinusoidal voltage in each coil. When there is no fluid flow through the meter, the voltages induced in each coil are in phase. When there is fluid flow, Coriolis forces are induced causing the tubes to twist in the opposite direction to each other, and this causes the voltages in the coils to be out of phase by an amount $\delta t$ which is proportional to the mass flow rate through the tubes. This amount $\delta t$ can be determined and used to provide an output signal which gives a highly accurate (up to around 0.1% of the total flow rate) value for the mass flow rate through the meter.

The output signal from all of the flow meters 32, 38, 46 is transmitted using standard telecommunications means to a central drilling control unit (not shown) which has a processor which is programmed to compare the rate of fluid flow into the bore hole 10 with the rate of fluid flow out of the borehole 10. If fluid is being injected into the borehole 10 at a higher rate than it is leaving the borehole 10, this indicates that some fluid is being lost to the formation and a reduction in bottom hole pressure is desirable. Alternatively, if the rate of flow of fluid out of the borehole 10 is significantly higher than the rate of flow of fluid into the borehole 10, this indicates that a kick of formation fluid has entered the borehole 10, and that an increase in bottom hole pressure may be desirable to stop this influx and that action needs to be taken to deal with the formation fluids already in the borehole 10. It will be appreciated that for this control mechanism to be effective, receiving accurate and reliable data from the flow meters 32, 38, 46 is critical.

The provision of two meters for measuring flow along the annulus return line 28 is advantageous as, if one meter is disrupted or fails, the other meter is available for monitoring the flow rate. Moreover, by virtue of using two different types of meter, the output from one meter can be compared with the output from the other for calibration purposes and to give an indication of the accuracy and reliability of the meters.

Both these meters only work well for measuring liquid flow rates, and the accuracy of the output of a flow meter deteriorates if there is any entrained gas in the liquid. When drilling into a formation it is quite common for some hydrocarbon gas to be present in the drilling mud. The hydrocarbon gas may be released as the formation is drilled away or produced from productive fractures or reservoir sands adjacent to the borehole 10 before the drilling mud can create an effective seal and filter cake over the borehole face. Whilst the drilling mud is under pressure in the annulus 16 and the annulus return line 28, this gas is either in solution in the drilling mud or compressed to its liquid state. The pressure in the annulus return line 28 downstream of the choke 30*a* is significantly lower than the pressure in the annulus return line 28 upstream of the choke 30*a*. As such, as the drilling mud exits the choke 30*a*, the entrained gas is depressurised, expands, and forms bubbles of gas in the liquid mud. The flow meter is positioned downstream of the choke in standard MPD systems, and these gas bubbles have a detrimental effect on the accuracy of the mass flow measurements obtained from the flow meter, and can even completely disrupt the flow of data from the meter. As discussed above, the mass flow readings are used for detecting kicks or loss of mud to the formation, and so the accuracy of these readings is vital to the stability of the drilling process. This problem is avoided in the present invention by positioning both the flow meters 32, 38 upstream of the choke 30*a*.

The provision of the filter 40 is advantageous because, without it, the two tubes in the Coriolis flow meter 32 could easily become blocked with particulate debris in the returning fluid, as these tubes each have a smaller cross-section sectional area than the Coriolis meter line 28*a*. Blocking of the Coriolis flow meter 32 could cause the fluid pressure in the system upstream of the flow meter 32 to increase to such an extent that the flow meter 32 or the piping of the Coriolis flow line 28*a* or annulus return line 28 is damaged or fails completely.

The apertures in the filter 40 are significantly smaller than the cross-section of these tubes so that any debris 42 which is sufficiently large to block the tubes is trapped by the filter 40 and prevented from entering the Coriolis meter 40, as illustrated in FIG. 4. Positioning the filter 40 at the T junction between the Coriolis meter line 28*a* and the annulus return line 28 is also advantageous as debris trapped by the filter 40 is washed off the filter 40 by fluid flowing along the annulus return line 28 and therefore the filter 40 is kept clear and does not generally become blocked. The dome shape of the filter 40 and arranging the filter 40 such that the centre portion extends into the Coriolis meter line 28 ensures that the filter 40 and any debris caught by the filter 40 does not impede flow of fluid along the annulus return line 28.

Whilst the provision of the filter 40 minimises the risk of damage to the system because of blocking of the Coriolis flow meter 32, in this embodiment of the invention, as a further safety precaution, the system 36 is provided with a pressure relief line 28*b* which extends from the annulus return line 28 between the active sonar meter 38 and the Coriolis meter line 28*a* to a main pressure relief valve 44. This pressure relief valve 44 is a standard pop off type pressure relief valve which normally substantially prevents fluid from flowing along the pressure relief line 28*b* but which is configured to open to allow fluid to flow along the pressure relief line 28*b* when the pressure upstream of the valve exceeds a predetermined value. The predetermined value is typically 50 psi below the maximum operating pressure of the lowest pressure rated component in the drilling system, which is usually the closure device 20.

The pressure relief line 28*b* is also provided with a branch 28*b*' which extends from the pressure relief line 28*b* upstream of the main pressure relief valve 44 to downstream of the main pressure relief valve 44. This branch 28*b*' therefore provides a conduit for fluid to flow along the pressure relief line 28*b*', by-passing the main pressure relief valve 44. In this branch line 28*b*' is provided an adjustable pressure relief valve 46. This valve 46 normally substantially prevents fluid from flowing along the branch line 28*b*', and the operation of the valve 46 is controlled by an electronic control unit which receives a pressure signal from a pressure sensor in the BHA 14, the annulus 16 or annulus return line 28 downstream of the pressure relief line 28*b*. The electronic control unit is programmed to compare this pressure signal with the desired bottom hole pressure/annulus pressure/annulus return line pressure, and to open the valve 46 if the difference is greater than a predetermined margin. In other words, the adjustable pressure relief valve 46 is set to open at a pressure which is greater by a predetermined margin than either the desired bottom hole pressure, annulus pressure or back pressure to be applied to the annulus 16 by the back pressure control system 36. As the desired pressure is constantly changing, the valve 46 is actively adjusted to maintain that predetermined margin whilst drilling progresses. The margin, and which pressure signal is used as a basis for comparison with the set point will depend on the type of formation being drilled.

For example, the adjustable pressure relief valve 46 may be set to open at a pressure margin of 50 psi above the bottom hole pressure set point. In this case, if the system is set to maintain the bottom hole pressure at 200 psi, the adjustable pressure relief valve 46 will be set to open if the pressure signal from the pressure sensor in the BHA 14 indicates that the bottom hole pressure is greater than 250 psi.

Both pressure relief valves 44, 46 are provided with means for communicating with the main drilling control unit so that if either valve 44, 46 is activated, i.e. opens because the maximum permitted pressure was exceeded, an electronic signal is transmitted to the main drilling control unit which may then display or sound a warning to alert an operator that there is a problem with the drilling system.

These pressure relief valves thus protect from damage caused by excess pressure build up from blocking or plugging of any component of the back pressure control system 36 downstream of the pressure relief line 28*b*. The main pressure relief valve 44 primarily protects the surface MPD equipment including the closure device 20, whilst the primary role of the adjustable pressure relief valve 46 is to protect the casing and formation, and to prevent the formation fracturing and drilling mud being lost to the formation.

Whilst only one back pressure control valve 30*a* is required to facilitate managed pressure drilling, in this embodiment of the invention, a second back pressure control valve 30*b* is provided in an annulus return relief line 28*c* which extends from the annulus return line 28 between the Coriolis meter line 28*a* and the first back pressure control valve 30*a* to a point on the annulus return line 28 downstream of the first back pressure control valve 30*a*. The second back pressure control valve 30*b* is normally closed so that there is no fluid flow along the annulus return relief line 28*c*, and the back pressure on the annulus 16 is controlled solely by operation of the first back pressure control valve 30*a*. If the first back pressure control valve 30*a* fails or becomes blocked, this valve is closed, and the second back pressure control valve 30*b* is opened so that all the fluid flow along the annulus return line

28 passes through the annulus return relief line 28*c*. The back pressure is then controlled by operation of the second back pressure control valve 30*b*.

During a typical managed pressure drilling operation, the back pressure control valve 30*a* or 30*b* is used to apply a back pressure of between 300 and 500 psi to the annulus 16. To achieve this all the components of the drilling system, including the closure device 20 and the back pressure control system 36 are preferably pressure rated to 1500 psi drilling and 2200 psi shut in pressure. Whilst a higher pressure rated system may, of course, be used, using a lower pressure rated system is advantageous as equipment with a lower pressure rating tends to be more widely available and less expensive.

This also allows a standard Coriolis meter (these are generally pressure rated to 1500 to 2000 psi) to be placed upstream of the back pressure control valves 30*a*, 30*b*.

Whilst the back pressure control valves 30*a* and 30*b* may be any known configuration of adjustable choke or valve which is operable to restrict the flow of fluid along a conduit to a variable extent, they are advantageously air configured as illustrated in FIGS. 5, 6, 7*a* and 7*b*. The adjustable pressure relief valve 46 may be configured in this way also.

Figure 5:
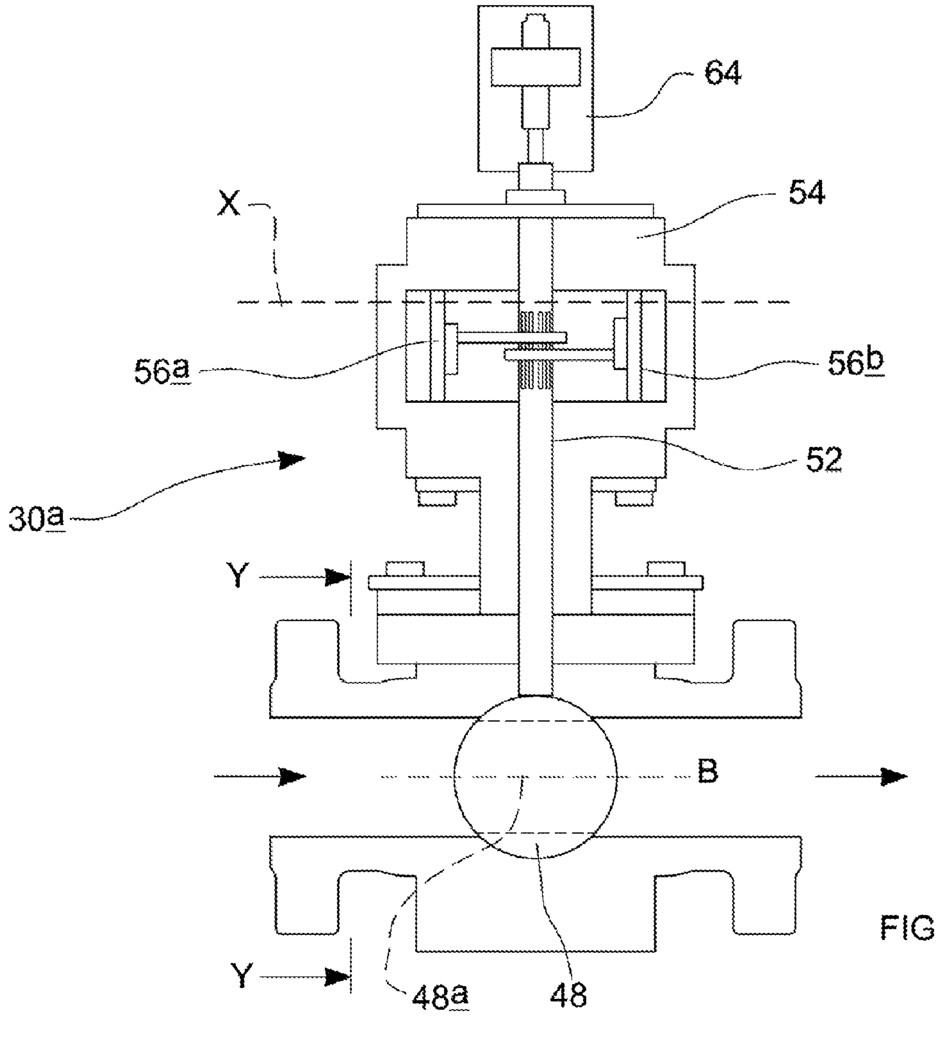
FIG. 5 shows an illustration of a cross-section through a back pressure control valve of the back pressure control apparatus shown in FIG. 3.

Referring now to FIG. 5, there is shown in detail a back pressure control valve 30*a* or 30*b* having a valve member 48 which is mounted in a central passage of a generally cylindrical valve body 50, the valve member 48 comprising a generally spherical ball. The valve body 50 is mounted in the annulus return line 28, annulus return relief line 28*c* or pressure relief line 28*b*' so that fluid flowing along the respective line 28, 28*c*, 28*b*' has to pass through the central passage of the valve body 50.

The diameter of the ball 48 is greater than the internal diameter of the valve body 50, and therefore the internal surface of the valve body 50 is shaped to provide a circumferential annular recess in which the ball 48 is seated. The ball 48 is connected to an actuator stem 52 which extends through an aperture provided in the valve body 50 generally perpendicular to the longitudinal axis of the central passage of the valve body 50 into an actuator housing 54. The actuator stem 52 is a generally cylindrical rod which is rotatable about its longitudinal axis within the actuator housing 54, and which has a pinion section providing radial teeth extending over at least a portion of the length of the actuator stem 52.

Figure 6:
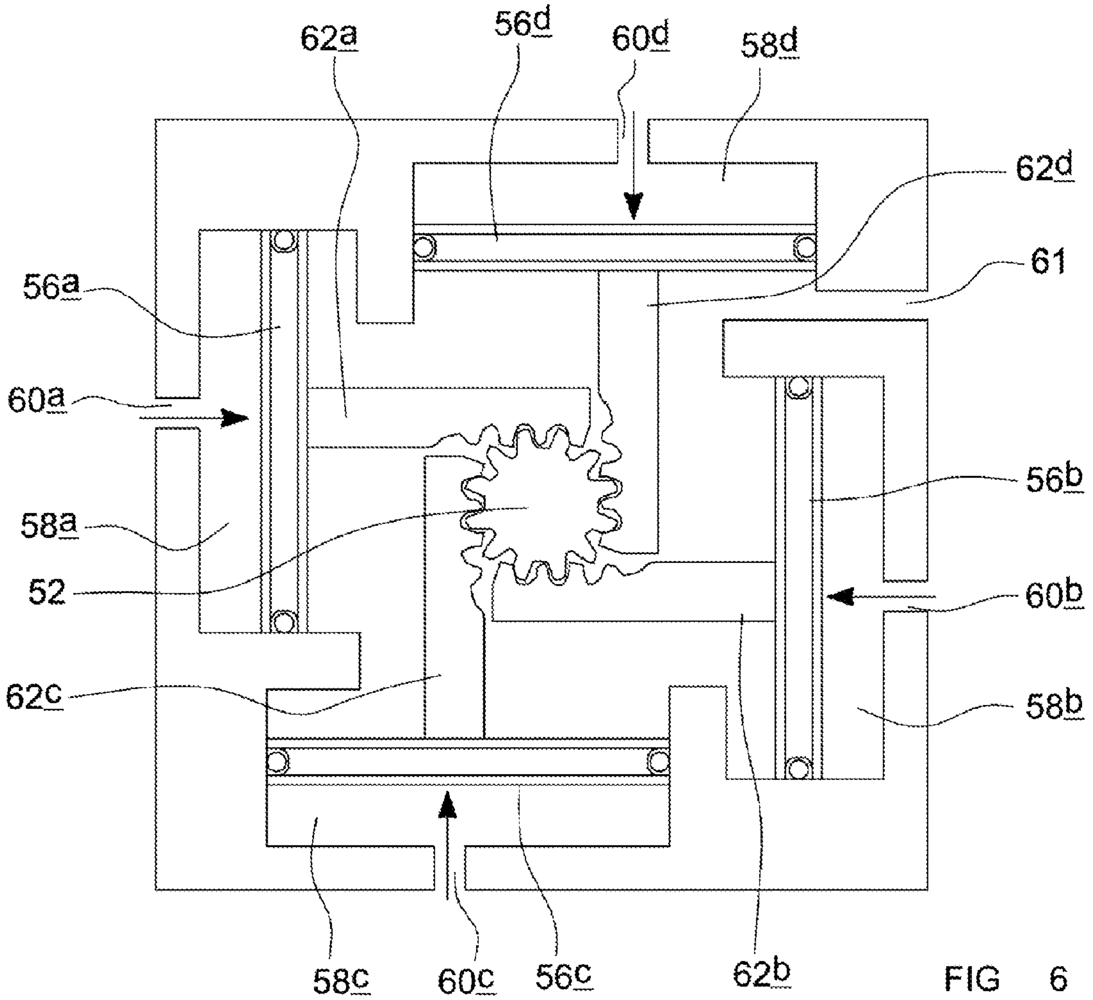
FIG. 6 shows a plan view of a cut-away section of the back pressure control valve along line X shown in FIG. 5, FIGS. 7*a* and 7*b* show a cut-away section of the back pressure control valve along the line Y shown in FIG. 5, with FIG. 7*a* showing the valve in a fully open position, and FIG. 7*b* showing the valve in a partially open position.

Referring now to FIG. 6, four pistons 56*a*, 56*b*, 56*c*, 56*d* are mounted in the actuator housing 54, the actuator housing 54 being shaped around the pistons 56*a*, 56*b*, 56*c*, 56*d* so that each piston 56*a*, 56*b*, 56*c*, 56*d* engages with the actuator housing 54 to form a control chamber 58*a*, 58*b*, 58*c*, 58*d* within the actuator housing 54. Each piston 56*a*, 56*b*, 56*c*, 56*d* is provided with a seal, in this example an O-ring, which engages with the actuator housing 54 to provide a substantially fluid tight seal between the piston 56*a*, 56*b*, 56*c*, 56*d* and the housing 54, whilst allowing reciprocating movement of the piston 56*a*, 56*b*, 56*c*, 56*d* in the housing 54. The pistons 56*a*, 56*b*, 56*c*, 56*d* are arranged around the actuator stem 52 to form two pairs, the pistons in each pair being generally parallel to one another and perpendicular to the pistons in the other pair. Four apertures 60*a* 60*b*, 60*c*, 60*d* extend through the actuator housing 54 each into one of the control chambers 58*a*, 58*b*, 58*c*, 58*d*, and a further aperture 61 extends through the actuator housing 54 into the remaining, central, volume of the housing 54 in which the actuator rod 52 is located.

Each piston 56*a*, 56*b*, 56*c*, 56*d* has an actuator rod 62*a*, 62*b*, 62*c*, 62*d* which extends generally perpendicular to the plane of the piston 56*a*, 56*b*, 56*c*, 56*d* towards the actuator stem 52. Each actuator rod 62*a*, 62*b*, 62*c*, 62*d* is provided with teeth which engage with the teeth of the pinion section of the actuator rod 52 to form a rack and pinion arrangement. Translational movement of the pistons 56*a*, 56*b*, 56*c*, 56*d* thus causes the actuator rod 52 and ball 48 to rotate.

An electrical or electronic rotation sensor 64, is, in this embodiment of the invention, mounted on the free end of the actuator stem 52 and transmits to the central drilling control unit an output signal indicative of the rotational orientation of the actuator stem 52 and ball 48 relative to the actuator housing 54 and valve body 50.

Figure 7A:
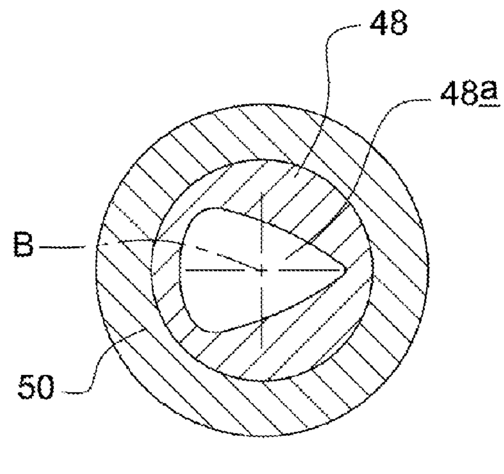
Figure 7B:
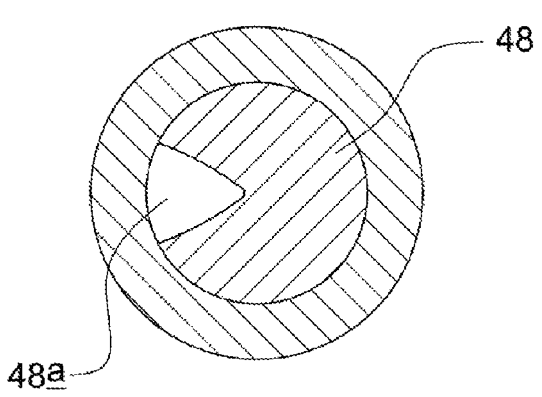

The ball 48 is provided with a central passage 48*a* which is best illustrated in FIGS. 7*a* and 7*b*. The central passage 48*a* extends through the ball 48 and has a longitudinal axis B which lies in the plane in which the longitudinal axis of the valve body 50 lies. When viewed in transverse cross-section, i.e. in section perpendicular to its longitudinal axis B, the central passage 48*a* has the shape of a sector of a circle, as best illustrated in FIG. 7*a*, i.e. has three major surfaces—one of which forms an arc and the other two of which are generally flat and inclined at an angle of around 45° to one another. As such, the central passage 48*a* has a short side where the two generally flat surfaces meet and a tall side where the arc surface extends between the two generally flat surfaces.

The ball 48 is rotatable through 90° between a fully closed position in which the longitudinal axis B of the central passage 48*a* is perpendicular to the longitudinal axis of the valve body 50, and a fully open position in which the longitudinal axis B of the central passage 48*a* coincides with the longitudinal axis of the valve body 50, as illustrated in FIGS. 6 and 7*a*. When the valve is in the fully open position, the entire cross-section of the central passage 48*a* is exposed to fluid in the valve body 50, and fluid flow through the valve body 50 is substantially unimpeded by the ball 48.

Between the fully open and fully closed position, there are a plurality of partially open positions in which a varying proportion of the cross-section of the central passage 48*a* is exposed to fluid in the valve body 50, as illustrated in FIG. 7*b*. When the valve 30*a* is in a partially open position, flow of fluid along the valve body 50 is permitted, but is restricted by the ball 48. The extent to which fluid flow is restricted depends on the proportion of the central passage 48*a* which is exposed to the fluid flow—the closer the ball 48 is to the fully open position, i.e. the greater the exposed area, the less the restriction, and the closer the ball 48 is to the fully closed position, i.e. the smaller the exposed area, the greater the restriction. Therefore the back pressure on the annulus 16 can be varied by varying the rotational position of the ball 48.

The ball 48 is oriented in the valve body 50 such that when the valve moves from the fully closed position to the fully open position, the short side of the central passage 48*a* is exposed first to the fluid in the valve body 50, the tall side of the central passage 48*a* being last to be exposed. The height of the passage 48*a* exposed to fluid in the valve body 50 thus increases as the ball 48 is rotated to the fully open position.

The central passage in a conventional ball valve is generally circular in cross-sectional area. The use of a central passage 48*a* with a sector shaped cross-section is advantageous as this ensures that there is a generally linear relationship between the angular orientation of the ball 48 and the degree of restriction of fluid flow along the valve body 50 over at least a substantial proportion of the range of movement of the ball 48. This means that it may be possible to control the back pressure applied to the annulus 16 to a higher degree of accuracy than in prior art managed pressure drilling systems.

The use of a ball valve is also advantageous because when the valve 30*a*, 30*b* is in the fully open position, the cross-sectional area available for fluid flow along the valve body 50 is substantially the same as the flow area along the flow line into the valve 30*a*, 30*b*. This means that if debris enters the valve 30*a*, 30*b* and blocks the central passage 48*a* of the ball 48 when the valve 30*a*, 30*b* is in a partially open position, the valve 30*a*, 30*b* can be unblocked and the debris flushed away by moving the ball 48 to the fully open position.

Whilst the valve 30*a*, 30*b* can be hydraulically actuated, preferably it is pneumatically operated, in this example using compressed air. The apertures 60*a*, 60*b*, 60*c* and 60*d* in the actuator housing 54 are connected to a compressed air reservoir and a conventional pneumatic control valve (not shown) is provided to control fluid of compressed air to the chambers 58*a*, 58*b*, 58*c*, 58*d*. Flow of pressurised fluid into the chambers 58*a*, 58*b*, 58*c*, 58*d* causes translational movement of the pistons 56*a*, 56*b*, 56*c*, 56*d* towards the actuator stem 52, which, by virtue of the engagement of the rods 62*a*, 62*b*, 62*c*, 62*d* with the pinion section of the actuator stem 52 causes the ball 48 to rotate towards the fully closed position.

A further aperture 61 is provided in the actuator housing 54, and this aperture extends into the central space in the housing 54 which is enclosed by the pistons 56*a*, 56*b*, 56*c*, 56*d*. Flow of pressurised fluid through the further aperture 61 into this central space causes translational movement of the pistons 56*a*, 56*b*, 56*c*, 56*d* away from the actuator stem 52, which, by virtue of the engagement of the rods 62*a*, 62*b*, 62*c*, 62*d* with the pinion section of the actuator stem 52 causes the ball 48 to rotate towards the fully open position.

The pneumatic control valve is electrically operated via the central drilling control unit which receives an input signal indicative of the fluid pressure at the bottom of the borehole 10 from a pressure sensor in the BHA 14. The central drilling control unit then uses standard MPD control algorithms to calculate the desired bottom hole pressure, and compares this with the actual bottom hole pressure.

If the bottom hole pressure is less than desired, the pneumatic control valve operates to allow compressed air flow to the chambers 58*a*, 58*b*, 58*c*, 58*d*. This causes the pistons 56*a*, 56*b*, 56*c*, 56*d* to move towards the actuator stem 52, and to rotate the ball 48 towards the fully closed position so that the restriction of fluid flow along the valve body 50 increases, and the back pressure applied to the annulus 16 increases. When the measured bottom hole pressure reaches the desired value, the pneumatic control valve operates to stop flow of fluid into or out of the chambers 58*a*, 58*b*, 58*c*, 58*d*, and hence to stop any further movement of the pistons 56*a*, 56*b*, 56*c*, 56*d*.

Similarly, if the bottom hole pressure is greater than desired, the pneumatic control valve operates to supply compressed air to aperture 61 to cause the pistons 56*a*, 56*b*, 56*c*, 56*d* to move away from the actuator stem 52, and to rotate the ball 48 towards the fully open position so that the restriction of fluid flow along the valve body 50 decreases, and the back pressure applied to the annulus 16 decreases. When the measured bottom hole pressure reaches the desired value, the pneumatic control valve operates to stop any further movement of the pistons 56*a*, 56*b*, 56*c*, 56*d*.

Actuating the valve pneumatically, rather than using hydraulic fluid, is advantageous as it increases the speed of operation of the valve. This is further increases by having a valve member which is rotatable between the open and closed positions, and the use of a rack-and-pinion arrangement to rotate the valve member. Whilst the valve could be actuated using a single piston, the provision of a plurality of pistons (in this example four) is advantageous as it increases the torque available to rotate the ball 48 without having a detrimental effect on the speed of operation of the valve.

The back pressure control system 36 also includes a three way diverter valve 66 with an inlet 66*a* connected to the annulus return line 28 downstream of the back pressure control valves 30*a*, 30*b*, a first outlet 66*b* connected to a mud gas separator 68 and a second outlet 66*c* connected to a shaker system 70. The shaker system is of conventional design and is operable to remove any solid matter from the returned drilling mud, whilst the mud gas separator removes any entrained gases. The pressure relief line 28*b* extends from the pressure relief valves 44, 46 to a further inlet of the mud gas separator, and an outlet of the mud gas separator is also connected to the shaker system 70. The shaker system has an outlet which is connected to the mud reservoir 34.

The diverter valve 66 has a valve member which is movable between a first position in which the valve inlet 66*a* is connected to the first outlet 66*b* and a second position in which the valve inlet 66*a* is connected to the second outlet 66*c*. The diverter valve 66 is configured such that fluid can always flow from the inlet 66*a* to one of the outlets 66*b*, 66*c*, i.e. the valve 66 can never be closed. The diverter valve 66 is provided with an electrical actuator, which may be operated remotely, for example via the central drilling control unit.

In normal use, the valve 66 is left in the first position, so that the returned drilling fluid (mud, cuttings and any other well bore fluids) passes through the mud gas separator 68 and the shaker system 70 before returning to the mud reservoir 34. The valve 66 may, however, be operated to move the valve member to the second position, to divert returning drilling fluid directly to the shaker system, for example if a large amount of debris is expected as a result of drilling out a casing shoe float system.

The disclosed drilling system can be used for managed pressure drilling with hydrostatically underbalanced drilling fluid weight and a dynamically overbalanced bottom hole pressure, for example where there is concern that the bottom hole pressure might exceed the fracture gradient of the formation 11 because the fracture gradient is unknown or there is a risk of crossing over a fault line or into another zone or lithology. When the system is used in such a way, the density of mud is selected such that the mud weight provides a static pressure which is lower than the pressure of fluid in the formation 11 (the formation pressure), and the bottom hole pressure is increased by the frictional effects of circulating mud during drilling and the operation of one of the back pressure control valves 30*a*, 30*b* to restrict fluid flow along the annulus return line 28 and therefore to induce a back pressure on the annulus 16, so that the bottom hole pressure is always higher than the formation pressure and no formation fluids are allowed into the borehole 10, at least during drilling.

This drilling system can also be used for managed pressure drilling with a hydrostatically overbalanced drilling fluid weight. When the system is used in this way, the mud density is selected such that the mud weight provides a static pressure which is greater than the formation pressure. Thus, the well is overbalanced and the bottom hole pressure is always higher than the formation even when drilling is not in progress.

Finally, this system can be used for pressurised mud cap drilling in which a heavy density mud cap is circulated into the top portion of the borehole and a lighter density fluid, usually sea water, is circulated in to the well bore below the mud cap. The back pressure system 36 is used to maintain the bottom hole pressure above the fracture gradient of the formation 11 so that the lighter density fluid is injected into the formation and the formation fluids are completely contained in the formation whilst drilling is in progress.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A drilling system including a drill string which extends into a borehole, and a well closure system which contains fluid in the annular space in the borehole fluid out of the annular space in the borehole around the drill string is permitted, the side port being connected to a fluid return line which extends from the side port to a fluid reservoir, there being provided in the fluid return line a valve which is operable to restrict flow of fluid along the fluid return line to variable extent, and a flow meter operable to measure the rate of flow of fluid along the fluid return line, the flow meter being located between the valve and the side port, wherein a filter is provided between the flow meter and the side port, the filter including a plurality of apertures which have a smaller cross-sectional area than the smallest fluid flow lines in the flow meter; wherein the flow meter is located in a branch line of the fluid return line which extends between a first portion of the fluid return line and a second portion of the fluid return line, the first portion being located between the side port and the second portion;

the filter is located at or adjacent to a junction between the branch line and the first portion of the fluid return line; and the filter has an edge or edges which are located at the junction between the branch line and the first portion of the fluid return line, and a central portion which extends into the branch line.

2. A drilling system according to claim 1 wherein the flow meter is a Coriolis flow meter.

3. A drilling system according to claim 1 wherein an active sonar flow meter is provided to measure the rate of fluid flow along the fluid return line.

4. A drilling system according to claim 3 wherein the active sonar flow meter is located between the side port and the Coriolis flow meter.

5. A drilling system according to claim 4 wherein the active sonar flow meter is a clamp-on meter.

6. A drilling system according to claim 1 wherein an inlet line extends into the drill string from a pump, and an inlet active sonar flow meter is provided to measure the rate of fluid flow along the inlet line.

7. A drilling system according to claim 6 wherein the inlet active sonar flow meter is a clamp-on meter.

8. A drilling system including a drill string which extends into a borehole, and a well closure system which contains fluid in the annular space in the borehole around the drill string, the well closure system having a side port whereby controlled flow of fluid out of the annular space in the borehole around the drill string is permitted, the side port being connected to fluid return line which extends from the side port to a fluid reservoir, there being provided in the fluid return line a valve which is operable to restrict flow of fluid along the fluid return line to variable extent, and a flow meter operable to measure the rate of flow of fluid along the fluid return line, the flow meter being located between the valve and the side port, wherein a filter is provided between the flow meter and the side port, the filter including a plurality of apertures which have a smaller cross-sectional area than the smallest fluid flow lines in the flow meter; wherein the flow meter is a Coriolis flow meter;

an active sonar flow meter is provided to measure the rate of fluid flow along the fluid return line; and the active sonar flow meter is located between the side port and the Coriolis flow meter.

9. A drilling system according to claim 8 wherein the flow meter is located in a branch line off the fluid return line which extends between a first portion of the fluid return line and a second portion of the fluid return line, the first portion being located between the side port and the second portion.

10. A drilling system according to claim 9 wherein the filter is located at or adjacent to a junction between the branch line and the first portion of the fluid return line.

11. A drilling system according to claim 10 wherein the filter has an edge or edges which are located at the junction between the branch line and the first portion of the fluid return line, and a central portion which extends into the branch line.

12. A drilling system according to claim 8 wherein the active sonar flow meter is a clamp-on meter.

13. A drilling system according to claim 8 wherein an inlet line extends into the drill string from a pump, and an inlet active sonar flow meter is provided to measure the rate of fluid flow along the inlet line.

14. A drilling system according to claim 13 wherein the inlet active sonar flow meter is a clamp-on meter.

* * * * *